(12) United States Patent
Mizuta

(10) Patent No.: US 6,304,888 B1
(45) Date of Patent: Oct. 16, 2001

(54) HIGH SPEED NUMERICAL INTEGRATION METHOD AND SYSTEM

(75) Inventor: Hideyuki Mizuta, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/251,987

(22) Filed: Feb. 17, 1999

(30) Foreign Application Priority Data

Feb. 17, 1998 (JP) .................................................. 10-034438

(51) Int. Cl.[7] ................................. G06F 7/38; G06F 1/02
(52) U.S. Cl. ............................................ 708/444; 708/250
(58) Field of Search .................................... 708/250, 253, 708/256, 444

(56) References Cited

U.S. PATENT DOCUMENTS

| | | | |
|---|---|---|---|
| 5,031,134 | * | 7/1991 | Kaplan et al. ........................ 708/444 |
| 5,790,442 | * | 8/1998 | Ninomiya et al. .................... 708/444 |
| 5,940,810 | * | 8/1999 | Traub et al. ............................ 705/36 |
| 5,949,876 | * | 9/1999 | Ginter et al. ............................ 705/39 |
| 6,208,738 | * | 3/2001 | Goldenfeld et al. .................. 380/287 |

* cited by examiner

Primary Examiner—Tan V. Mai
(74) Attorney, Agent, or Firm—Ronald L. Drumheller

(57) ABSTRACT

To provide a numerical integration system and method, suitable for a high-order dimensional Monte Carlo calculation and having high convergence speed without incurring a calculation time penalty, a multi-dimensional sequence is first converted into a one-dimensional value. Then the conversion is optimized in accordance with characteristics of a model. A summation calculation is corrected by using an averaged weight, instead of correcting the values of a random sequence. Then a histogram is prepared to correct the overall shape of the distribution of a random number sequence. DA sum is calculated for each group obtained when the histogram is prepared. As a result, the convergence speed is increased without sacrificing the calculation time.

10 Claims, 7 Drawing Sheets

| Sample count N | No weighting | Weighted |
|---|---|---|
| 1,000 | 0.0007462 | 0.00005741 |
| 100,000 | 0.0000244 | 0.000009097 |

FIG. 8

HIGH SPEED NUMERICAL INTEGRATION METHOD AND SYSTEM

BACKGROUND OF THE INVENTION

1. Field of the Invention

The present invention relates to a high speed numerical integration system and method, and in particular to a high speed numerical integration system and method for converting a multi-dimensional sequence into a one-dimensional characteristic value, and for calculating a weighted average for correction.

2. Related Art

Conventional, well known variance reduction methods for Monte Carlo (MC) calculations using a pseudo-random number are as follows.

Antithetic Variable Method

A random sequence and a sequence having the same absolute value but with an opposite sign are joined together to obtain an antithetic distribution of variables in order to reduce variance.

Moment Matching Method

An average and a variance are acquired from a random sequence that has been generated, and the values of the random numbers being corrected so that an anticipated average and variance are obtained.

Since a generated random number is processed using these methods, a problem concerning the autocoorelation has arisen.

In addition, since according to the moment matching method all the random numbers that have been generated must be stored, this method is not practical for high-order dimensions.

Furthermore, these methods by which the locations of points are altered are not suitable for a sequence, such as an LDS (low-discrepancy sequence) that provides biasless sample points.

SUMMARY OF THE INVENTION

It is, therefore, one object of the present invention to provide a numerical integration system and method suitable for a high-order dimensional Monte Carlo calculation.

It is another object of the present invention to provide a numerical integration system and method for acquiring a characteristic in accordance with an integration model and for optimizing the characteristic.

It is an additional object of the present invention to provide a numerical integration system and method as a suitable variance reduction method for an LDS (low-discrepancy sequence).

It is a further object of the present invention to provide a numerical integration system and method for correcting the shape of the distribution of a random number sequence.

It is still another object of the present invention to provide a numerical integration system and method that do not require a large memory capacity for the execution of an integration calculation.

To achieve the above objects: a multi-dimensional sequence is converted into a one-dimensional value; the conversion is optimized in accordance with characteristics of a model; a summation calculation is corrected by using an averaged weight, instead of correcting the values of a random sequence; a histogram is prepared to correct the overall shape of the distribution of a random number sequence; and a sum is calculated for each group of the histogram.

By employing these steps, the convergence speed is increased without sacrificing the calculation time.

Assume that a value of a multi-dimensional integrand is acquired by using a multi-dimensional random number. A set of random numbers required for acquiring one numerical value is called a scenario. According to the conventional Monte Carlo method, this operation is repeated N times and the average for N obtained numerical values is calculated to perform integration of the function.

During each operation, a one-dimensional value is calculated using the multi-dimensional random number. It is preferable that the one-dimensional value matches the characteristic of an integrand.

The one-dimensional values are sorted into several groups, and the appearance frequency for each group is recorded. In addition, the sum of the integrand values corresponding to the current multi-dimensional random numbers is also recorded for each group.

After this process has been repeated N times, a ratio of the recorded appearance frequency to the distribution of one-dimensional values that is theoretical expected for each group is recorded as the weight for a group. For example, assume that a multi-dimensional random number that is consonant with the normal distribution is employed and that its one-dimensional value equals the sum of the individual elements. Since the one-dimensional value is again consonant with the normal distribution, the theoretical distribution can be easily calculated.

Finally, a product of the summation of integrand values and the weight is calculated for each group to obtain the sum for the individual group. This sum is divided by the sum of the weights of all the groups, and the integration value employing the corrected Monte Carlo calculation can be obtained.

BRIEF DESCRIPTION OF THE DRAWINGS

FIG. 8 is a table showing relative errors occurring having the calculation of theoretical values when the present invention is employed and when it is not employed.

DESCRIPTION OF THE PREFERRED EMBODIMENT

Figure 1:
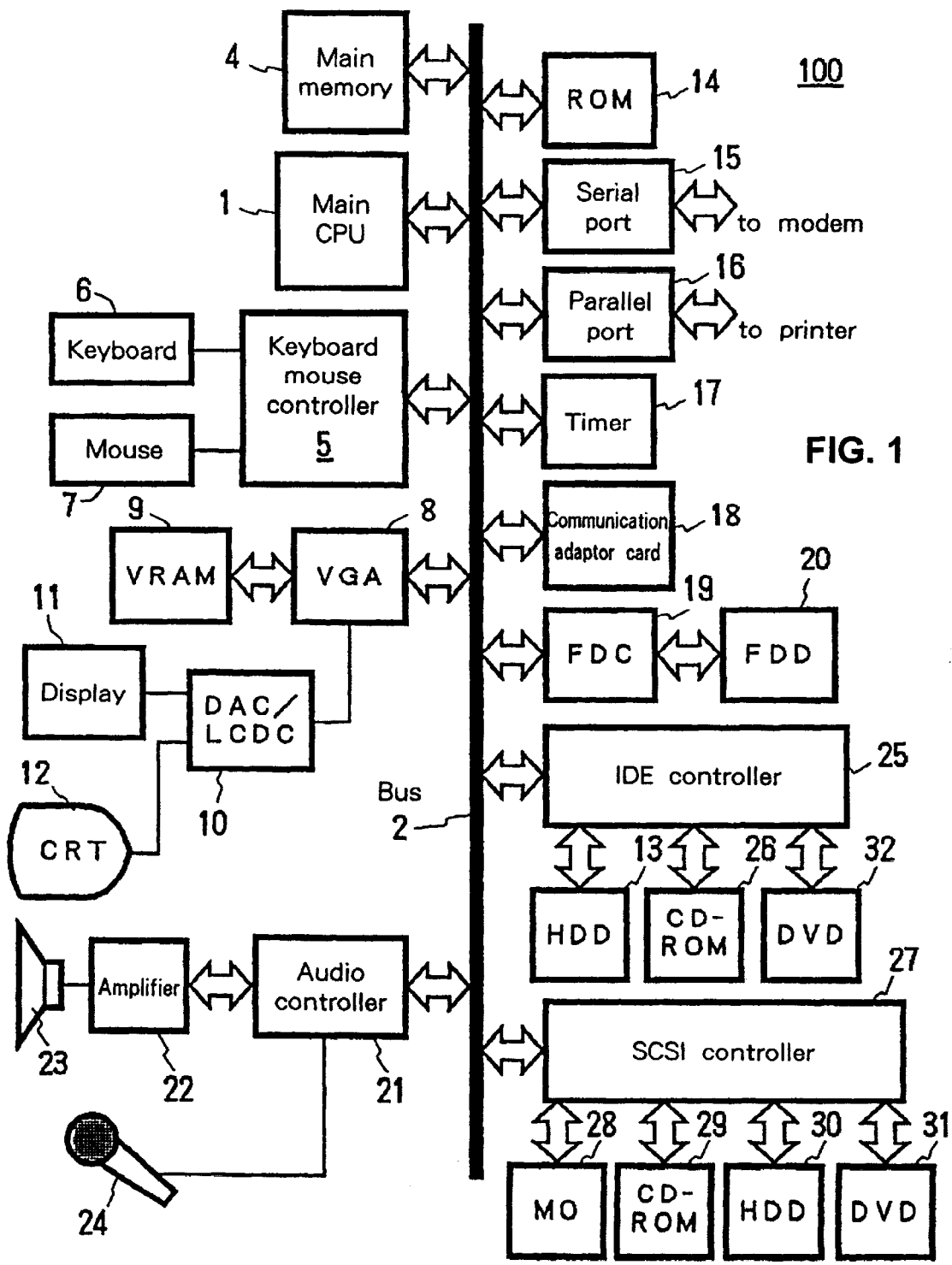
FIG. 1 is a diagram illustrating the hardware arrangement of an integration system according to the present invention.

The preferred embodiment of the present invention will now be described while referring to the accompanying drawings. In FIG. 1 is shown an example hardware arrangement for an integration system 100 according to the present invention. The integration system 100 includes a central processing unit (CPU) 1 and a memory 4. The CPU 1 and the memory 4 are connected via a bus 2 and an IDE controller 25 to a hard disk drive 13 (or to a storage medium driver such as an MO, a CD-ROM or a DVD), which is an auxiliary device. Similarly, the CPU 1 and the memory 4 are connected via the bus 2 and a SCSI controller 27 to a hard disk drive 30 (or to a storage medium driver such as an MO, a CD-ROM or a DVD), which is an auxiliary device. A floppy disk drive 20 is also connected to the bus 2 via a floppy disk controller 19. Preferably, an appearance frequency, a value of an integrand corresponding to a multi-dimensional random number, and a sum are stored for each group on the hard disk 13 or in the memory 4.

A floppy disk is inserted into the floppy disk drive 20. A computer program code or a data, which interacts with an operating system and issues commands to the CPU 1, etc., to implement the present invention is stored on the floppy disk, or on a hard disk 13 (or another storage medium, such as an MO, a CD-ROM or a DVD) and in a ROM 14, and is loaded into the memory 4 for execution. The computer program code may be compressed, or may be divided into a plurality of segments and stored on a plurality of media.

A system 100 further includes user interface hardware components, such as a pointing device 7 (a mouse or a joystick) or a keyboard 6 for data entry, or a display 12 for providing visual data for a user. A printer and a modem can be connected to the system 100 via a parallel port 16 and a serial port 15, respectively. The system 100 can also be connected to a network via the serial port 15 or a communication adaptor 18 (an ethernet or a token ring card) for communication with another computer. A remote controlled transceiver may be connected to the serial port 15 or to the parallel port 16 to exchange data using infrared rays or electric waves.

A loudspeaker 23 receives an analog audio signal, which is obtained by D/A (digital/analog) conversion performed by an audio controller 21, via an amplifier 22, and outputs it as sound. The audio controller 21 receives audio data from a microphone 24 and performs the A/D (analog/digital) conversion of it, and fetches external audio data.

It can be easily understood that the integration system 100 of the present invention may be provided as an ordinary personal computer (PC), a work station, a notebook PC, a palmtop PC, a network computer, a home electric appliance, such as a television incorporating a computer, a game machine having a communication function, a telephone, a facsimile machine, a portable telephone, a PHS, a communication terminal, including a personal digital assistant, having a communication function, or a combination of them. In addition, the previously described components are merely examples; not all the listed components are required for the integration system 100.

Figure 2:
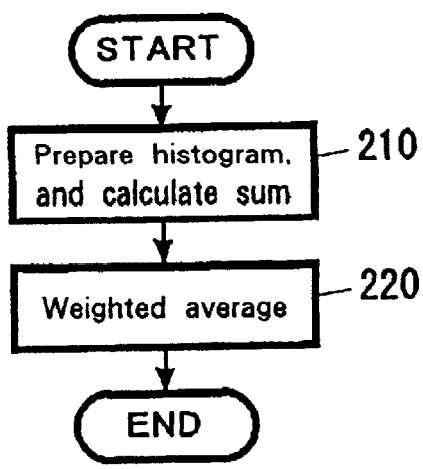
FIG. 2 is a flowchart showing the processing performed by the integration system according to the present invention.

FIG. 2 is a flowchart for the processing according to the present invention. First, block 210 is a histogram preparation and summation calculation block wherein the histogram and the sum of an integrand is calculated for an adequate number of scenarios. By preparing the histogram, the overall shape of the distribution of a random number sequence can be corrected. Block 220 is a weighted average block for sum correction using the histogram to obtain an average. That is, instead of correcting the random numbers, the calculation of the sum is corrected using the weighted average.

Figure 3:
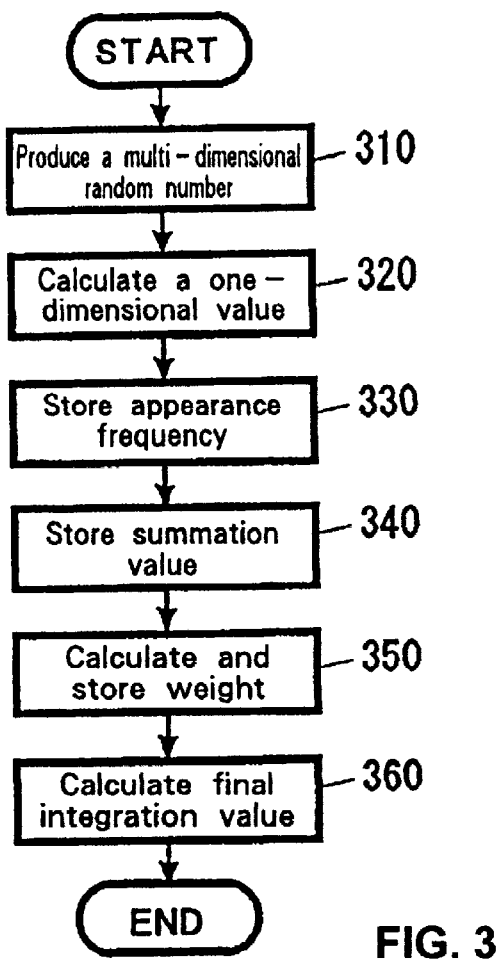
FIG. 3 is a detailed flowchart for the integration system of the present invention.

FIG. 3 is a detailed flowchart according to the present invention. Block 210 in FIG. 2 corresponds to blocks 310 to 340 in FIG. 3, and block 220 in FIG. 2 corresponds to blocks 350 and 360 in FIG. 3. First, block 310 is a multi-dimensional random number generation block and block 320 is a one-dimensional value calculation block employing the multi-dimensional random numbers. It is preferable that the one-dimensional value matches the characteristic of the integrand. Block 330 is an appearance frequency storage block wherein the one-dimensional value is sorted into several groups and the appearance frequency for each group is stored. Block 340 is a summation storage block wherein the integrand value corresponding to the current multi-dimensional random number is added to the sum of the integrand values with sorted group. Block 350 is a weighting calculation and storage block wherein a ratio of the one-dimensional value distribution, which is theoretically expected for each group, to the recorded appearance frequency is stored as a weight relative to the group. When a multi-dimensional random number that follows the normal distribution is employed, and its one-dimensional value is regarded as a sum of individual elements, the one-dimensional value is consonant with the normal distribution and its theoretical distribution can be easily calculated. Block 360 is a final integration value calculation block. Specifically, a product of the sum of the integrand values and a weight is calculated, and the sum of the products is obtained for each group. The sum is divided by the sum of the weights of all the groups, and thus a desired integrated value can be obtained.

Figure 4:
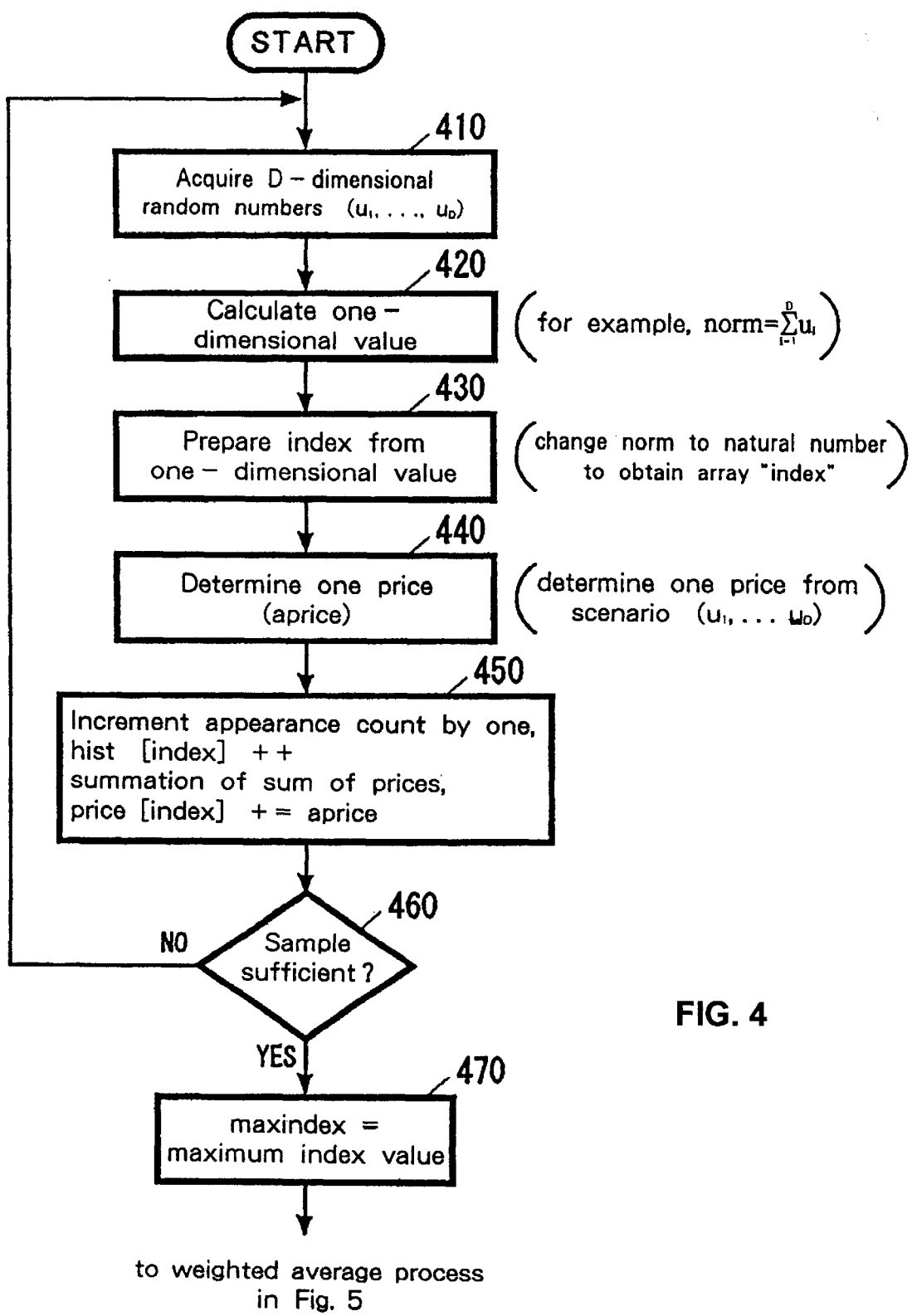
FIG. 4 is a flowchart according to the present invention.
Figure 5:
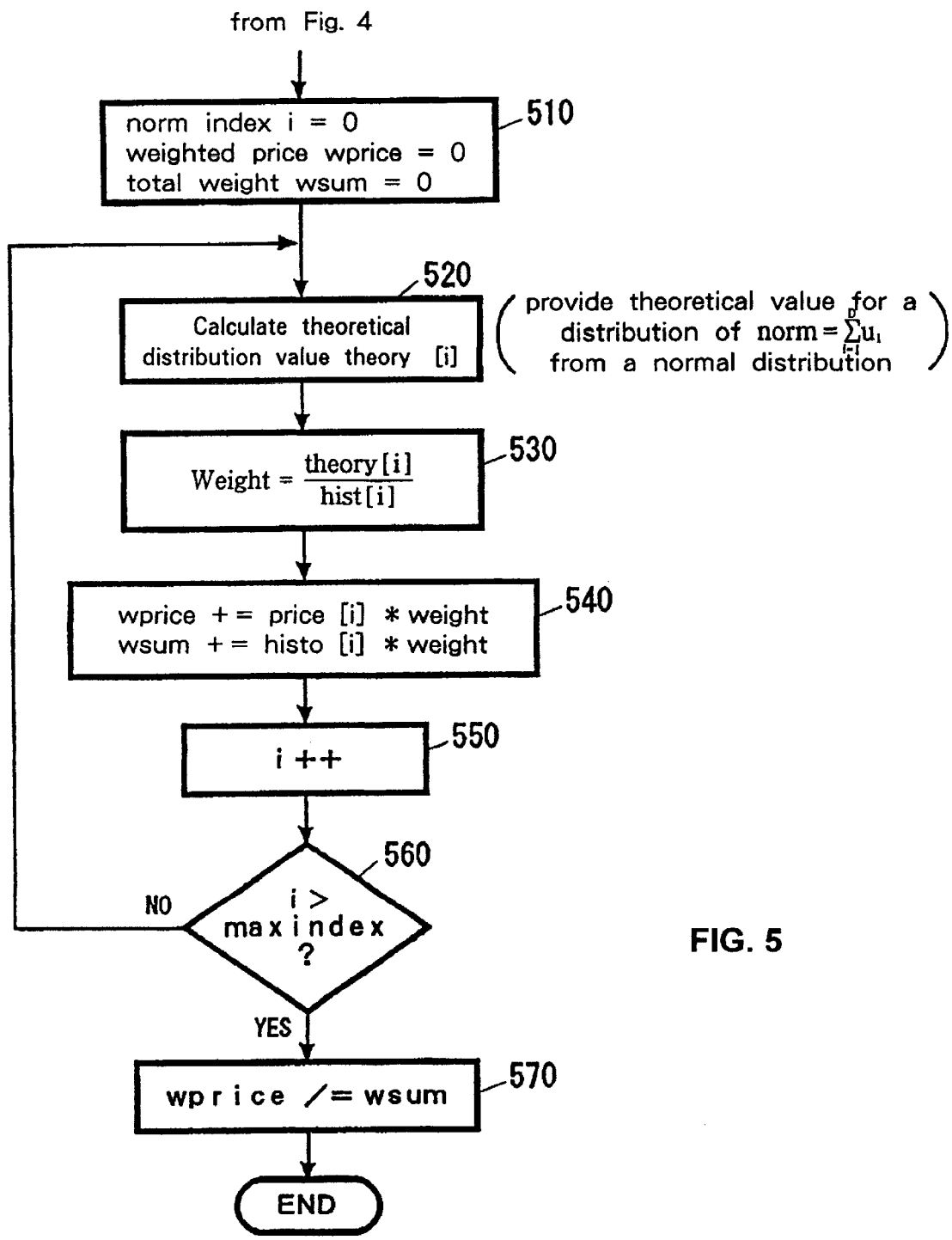
FIG. 5 is a flowchart according to the present invention.

FIGS. 4 and 5 are flowcharts for the processing according to the present invention. A price calculation of derivatives is employed in order to make the explanation easier to understand. First, at step 410 a multi-dimensional random number sequence is generated, and at step 420 the sum of individual elemements of the multi-dimensional random numbers is calculated in order to acquire a one-dimensional value for the multi-dimensional random numbers. The one-dimensional value may be any other value so long as it conforms to the characteristic of the integrand. At step 430 the one-dimensional value is transformed into a natural number index of an array used to sort the value into several groups. At step 440 one price is determined by employing a scenario of the random number sequence. At step 450, the appearance frequency and the sum of values of the integrand which correspond to the current multi-dimensional random number are stored for each group. At step 460 a check is performed to determine whether the histogram and the sum of prices are acquired for a satisfactory number of scenarios. If the result is Yes, at step 470 the maximum index value is set as the maxindex, and program control moves to the process for the calculation of a weighted average in FIG. 5. If the result at step 460 is No, program control returns to step 410. The value maxindex may be defined in advance as a constant, or may be dynamically changed during the processing.

At step 510 initialization is performed when an index (a norm index) for a one-dimensional value is defined as i, a weighted price is defined as wprice, and the total weight is defined as wsum. Then, at step 520 the distribution of a one-dimensional value that is theoretically expected for each group is obtained. At step 530 the ratio of the distribution of the one-dimensional value theoretically expected for each group to the recorded appearance frequency is stored as the weight of a group. At step 540 the weighted price wprice and the total weight wsum are multiplied by the weight. At step 550 the index i is incremented by 1. At step 560 a check is performed to determine whether the index i is grater than maxindex. If the result obtained is No, program control returns to step 520. If the result is Yes, at step 570 the sum of all the groups of products of the cumulative integrand value and the weight is divided by the sum of the weights of all the groups. Thus, the integration value using the corrected Monte Carlo method can be acquired.

An example of a pricing calculation for a complicated derivative that uses the present invention will now be described. Conventionally, to acquire an expected value for a price process while taking changes in interest rates into account, the Monte Carlo method using pseudo-random numbers is frequently employed. However, higher-speed processing is required for the risk management of a large portfolio and real-time demonstrations for clients. When the Vasicek Model is employed, a change in the interest rate dr is provided by using time evolution dt and Wiener process dz, as in equation 1, where mean reversion a and b, drift $\mu$ and volatility $\sigma$ are constants.

$$dr = a(b-r)dt + \sigma dz \quad \text{[Equation 1]}$$

Then, discretization is performed with the Euler approximation. When the time interval is defined as $\Delta t$, a normal random number of N(0, 1) is defined as $u_i$ (i=0, ..., $i_{max}$), and interest rate $r_i$ at time $t=i\Delta t$ is provided by equation 2:

$$r_{i+1} - r_i = a(b-r_i)\Delta t + \sigma u_i \sqrt{\Delta t} \quad \text{[Equation 2]}$$

A five-year discount bond is employed as an example product whose price is to be determined by using changes in interest rate. The present value of a bond which will be paid for a single unit five years hence is considered. The present value must be discounted in accordance with the five-year interest rate process provided by the Vasichek Model. That is, it is assumed that if this amount of money is invested for five years with the interest rate process, it will yield the same amount of money that will be paid for a bond at the end of five years. Assuming that the discretization unit $\Delta t$ is $1/288$ year, $i_{max} = 1439$.

At this time, interest rate $r_i$ is employed to calculate price P as follows:

$$P = \exp\left(-\Delta t \sum_{i=0}^{i=i_{max}} r_i\right) \quad \text{[Equation 3]}$$

When, for example, $r_0 = 0.021673$, $a = 0.1817303$, $b = 0.0825398957$ and $\sigma = 0.0125901$, the previous equation 2 is calculated and the interest rates $r_1$ to $r_{1439}$ are provided, so that the present value of the five-year discount bond can be calculated. According to the Monte Carlo method, in the equation for calculating the interest rates, $u_1$ to $u_{1439}$ are acquired using pseudo-random numbers, and price P is calculated. Since a different P is provided when random numbers are sequentially generated, N prices $f_i$ are calculated and the average is employed as the result.

$$\hat{f} = \frac{1}{N}\sum_{i=1}^{N} f_i \quad \text{[Equation 4]}$$

As N is increased, a reduction in the evaluation error is obtained as a product of the ratio $1/\sqrt{N}$. Therefore, in order to obtain an accuracy that is ten times greater, 100 times as many calculations are required. When a low-discrepancy sequence is employed instead of a pseudo-random number to extract the sample used for acquiring $f_i$, the evaluation error can be provided by the ratio $1/N$. Therefore, the calculation amount required for obtaining necessary accuracy can be reduced considerably. When the histogram method of the present invention is further employed, convergence occurs rapidly and accuracy is improved. A calculation using the Monte Carlo method that normally takes one day can be completed within ten minutes by the LDS, and within one minute by the LDS for which the present invention is also employed.

Figure 6:
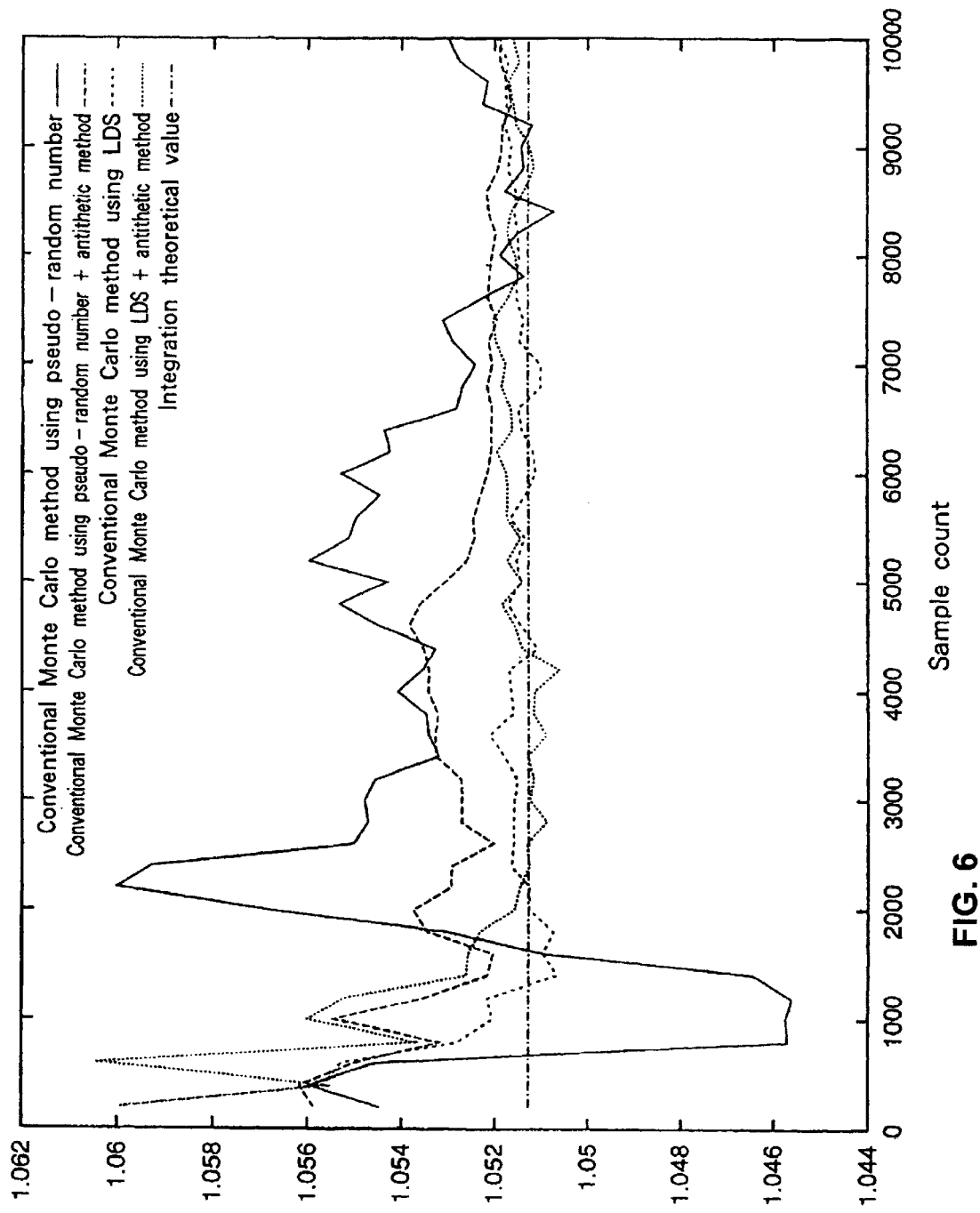
FIG. 6 is a graph showing a convergence process for the prior art when a bond model is assumed to be an integrand.
Figure 7:
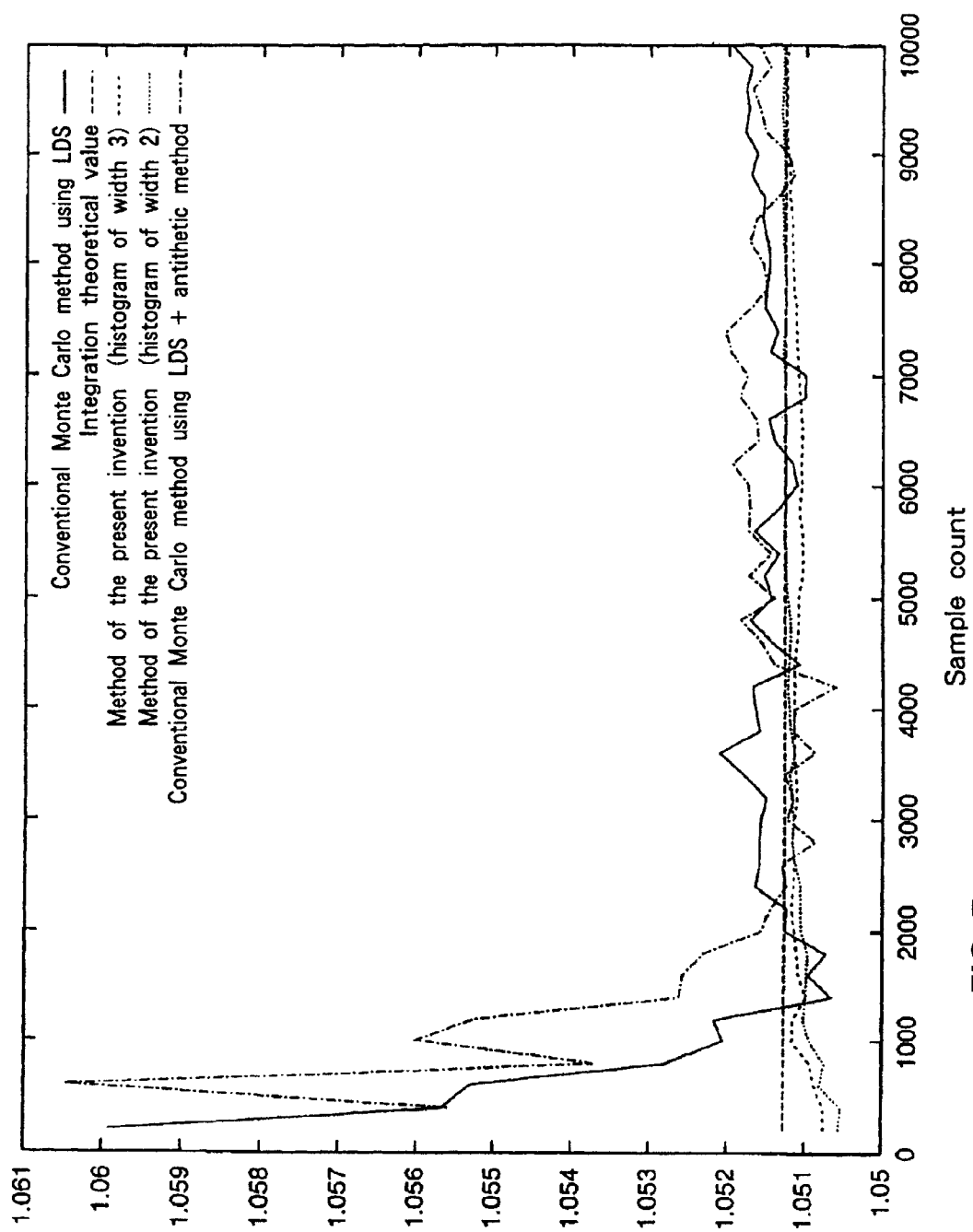
FIG. 7 is a graph showing a convergence process for the present invention when a bond model is assumed to be an integrand.

In FIGS. 6 and 7 are shown the convergence processes for the prior art and for the present invention when U is defined as a 1000 dimensional normal random number, a simple bond model, $\exp(0.01\Sigma Ui)$, is employed as an integrand. In FIG. 6 is shown the convergence process when the method of the present invention is not employed. It is apparent that the convergence occurs more quickly when the LDS is employed than when the pseudo-random number is used. However, a satisfactory convergence is not obtained even with 10000 samples. In FIG. 7 is shown the convergence processing when the method of the present invention (histogram widths of 2 and 3) is employed. It is apparent that, compared with the prior art, with 10000 samples a satisfactorily fast convergence can be performed to obtain a theoretical integration value. Relative errors occurring during the calculation of theoretical values are as shown in the table in FIG. 8.

As a reference, an example program according to the flowcharts in FIGS. 4 and 5 are shown as follows. STATNUM, STATLEN, TNUM and D may be respectively defined, in advance, as 2000, 2.0, 100 and 1000, or may be dynamically changed.

void gettheory(double theory[STATNUM]);
double getaverage(double theory[STATNUM],
int ustat[STATNUM], double psum[STATNUM], long cnt);

```
int
main()
{
    long     jj, maxcount = 10000;
    double   u [D];
    double   norm, price, priceave;
    int      i, nindex, ustat[STATNUM];
    double           psum[STATNUM], theory[STATNUM];
    for (i = 0; i < STATNUM; i++)
    {
        ustat[i] = 0;
        psum[i] = 0;
    }
    gettheory(theory);
    for (jj = 1; jj <= maxcount; jj++)
    {
        getrandom(u) ;  /* get D-dim random sequences */
        norm = calcnorm(u) ;  /* calc norm of random
            sequence */
        nindex = (int) ((norm+STATNUM*STATLEN / 2)
            /STATLEN);
        price = value(u) ;  /* get a price from a scenario */
        ustat [nindex] ++;
        psum[nindex] += price;
    }
    priceave = getaverage(theory, ustat, psum, maxcount);
    printf("result: %.16f\n", priceave);
}
void gettheory(double theory[STATNUM])
{
    int mid = STATNUM / 2;
    int i, j;
    double dx = STATLEN / TNUM;
    double c, f, sum, x, total = 0;
    c = dx / sqrt(2 * D * 3.1415926536);
    for (i = 0; i < mid - 1; i++)
    {
        sum = 0;
        for (j = 0; j < TNUM; j++)
        {
            x = i * STATLEN + (j + 0.5) * dx;
            f = exp(-x * x/(2 * D))   * C;
            sum + = f;
        }
        theory[mid + i] = theory[mid - i - 1] = sum;
```

-continued

```
        total + = sum;
    }
    theory[0] = theory[STATNUM −1] = 0.5 − total;
}
double getaverage(double theory[STATNUM],
int ustat[STATNUM], double psum[STATNUM], long cnt)
{
    double pricesum = 0.0, wsum = 0.0, weight;
    int i;
    for (i = 0; i < STATNUM; i++)
    {
        weight = theory[i] / ustat[i];
        pricesum += psum[i] * weight;
        wsum += weight * ustat [i]
    }
    return pricesum / wsum;
}
```

Conventionally, the Monte Carlo method is used for the calculation of prices for complicated derivatives, such as options or swaps. Such a calculation takes an extended period of time, even when a high-performance computer is used. This situation, however, can be improved considerably by using a low-discrepancy sequence (LDS) instead of a random number. In the present invention, this calculation method is even further improved, so that the number of calculations required to obtain a price having a required accuracy can be further reduced. A price calculation that would take one day using the Monte Carlo method can be completed within ten minutes using the LDS method and within one minute when the present invention is employed for the LDS method. Such a high-speed calculation technique is indispensable for the risk management by a bank with a large portfolio and for the explanation of prices to customers. When the method of the present invention is employed, the speed of convergence can be increased without incurring a calculation time penalty.

What is claimed is:

1. A high speed numerical integration system, for using a computer to integrate a function having a plurality of variables, comprising:

a random number producer for producing a plurality of sets of multi-dimensional random numbers to integrate said function having a plurality of variables;

means for storing, in a storage device, a histogram for said plurality of sets of multi-dimensional random numbers and the sum of the function values; and a weighted average calculator for calculating a weighted average using said histogram and said sum.

2. A system as in claim 1 wherein the high speed numerical integration system is a derivatives price accounting system for rapidly calculating prices of derivatives.

3. A high speed numerical integration system as claimed in claim 2, wherein the means for employing a distribution of said appearance frequency to calculate a weighted average from a sum of the products of said appearaace frequencies and said summations comprises:

means for storing in said storage device a ratio, as a weight for a group, for a one-dimensional value distribution, which is theoretically predicted for each of said groups, of said appearance frequency;

means for calculating a product of a sum of the function values and a weight for each of said groups;

means for calculating a sum of said products for said groups; and means for dividing said sum by a sum of the weights of said groups.

4. A system as in claim 3 wherein the high speed numerical integration system is a derivatives price accounting system for rapidly calculating prices of derivatives.

5. A high speed numerical integration system, for using a computer to integrate a function having a plurality of variables, comprising:

means for acquiring a plurality of function values from a set of multi-dimensional random numbers;

means for calculating a one-dimensional numerical value for each set of multi-dimensional random numbers;

means for sorting said one-dimensional numerical values to produce a plurality of groups and for storing an appearance frequency for each group in a storage device;

means for storing in said storage device the sum, for each group, of function values corresponding to said multi-dimensional random numbers; and means for employing a distribution of said appearance frequency to calculate a weighted average from a sum of the products of said appearance frequencies and said summations.

6. A system as in claim 5 wherein the high speed numerical integration system is a derivatives price accounting system for rapidly calculating prices of derivatives.

7. A high speed numerical integration method, for using a computer to integrate a function having a plurality of variables, comprising the steps of:

producing a plurality of sets of multi-dimensional random numbers to integrate said function having a plurality of variables;

storing, in a storage device, a histogram for said plurality of sets of multi-dimensional random numbers and the sum of the function values; and calculating a weighted average using said histogram and said sum.

8. A method as in claim 7 wherein the high speed numerical integration method is a method for using a computer to rapidly calculate prices of derivatives.

9. A recording medium for storing a program for enabling a computer to perform high speed integration of a function having a plurality of variables, said program comprising:

a function for producing a plurality of sets of multi-dimensional random numbers to integrate said function having a plurality of variables;

a function for storing, in a storage device, a histogram for said plurality of sets of multi-dimensional random numbers and the sum of the function values; and a function for calculating a weighted average using said histogram and said sum.

10. A recording medium as in claim 9 wherein the program enables a computer to rapidly calculate prices of derivatives.

* * * * *